(12) United States Patent
Fan et al.

(10) Patent No.: US 7,197,227 B2
(45) Date of Patent: Mar. 27, 2007

(54) ASSEMBLY STRUCTURE OF OPTICAL FILM AND FRAME

(75) Inventors: Chia-Rung Fan, Taoyuan County (TW); Yao-Tung Wang, Taoyuan (TW)

(73) Assignee: Chunghwa Picture Tubes, Ltd., Taipei (TW)

( * ) Notice: Subject to any disclaimer, the term of this patent is extended or adjusted under 35 U.S.C. 154(b) by 109 days.

(21) Appl. No.: 10/906,539

(22) Filed: Feb. 24, 2005

(65) Prior Publication Data

US 2006/0088270 A1    Apr. 27, 2006

(30) Foreign Application Priority Data

Oct. 27, 2004    (TW) ................ 93132502 A

(51) Int. Cl.
 G02B 6/00    (2006.01)
 G02F 1/1333    (2006.01)
 G02F 1/1335    (2006.01)

(52) U.S. Cl. ................ 385/147; 349/58; 349/65

(58) Field of Classification Search ............ None
See application file for complete search history.

(56) References Cited

U.S. PATENT DOCUMENTS 6,175,396 B1 *    1/2001    Kim et al. .................... 349/58

6,773,127 B2 *    8/2004    Kao ............................ 362/627
6,835,961 B2 *    12/2004    Fukayama ................... 257/84

FOREIGN PATENT DOCUMENTS

KR    2003091225 A    *  12/2003

* cited by examiner

*Primary Examiner*—Sung Pak
*Assistant Examiner*—Omar Rojas
(74) *Attorney, Agent, or Firm*—Jianq Chyun IP Office

(57) ABSTRACT

An assembly structure of an optical film and a frame is provided. The optical film has a body and at least a positioning structure protruding from the edge of the optical film. The positioning structure has a sticking part and a neck. The neck is connected between the sticking part and the body. In addition, the frame is arranged to surround the optical film, and the frame has at least a slot. The positioning structure is located within the slot, and a restriction protrusion corresponding to the neck of the positioning structure is formed on the frame at an entrance of the slot, so that the sticking part of the positioning structure is restricted within the slot.

8 Claims, 5 Drawing Sheets

ASSEMBLY STRUCTURE OF OPTICAL FILM AND FRAME

CROSS-REFERENCE TO RELATED APPLICATION

This application claims the priority benefit of Taiwan application serial no. 93132502, filed Oct. 27, 2004.

BACKGROUND OF THE INVENTION

1. Field of the Invention

This invention relates in general to an assembly structure. More specifically, the present invention relates to an assembly structure of an optical film and a frame.

2. Description of Related Art

As the multimedia technology is highly developed, transmission of image information is currently changed from analog to digital. To comply with the modern life style, lighter, thinner and smaller video or image devices are highly desirable. Although the traditional cathode ray tube (CRT) display has superior display quality and low cost, the CRT display fails to meet the present market demand, namely, lighter, thinner, smaller and low power consumption requirements due to its funnel structure. Furthermore, the radiation issue of the CRT display is also a serious problem for the viewer's eyes. In recent years, since the optoelectronic technology and the semiconductor device technology become more mature, the flat panel displays are accordingly developed. Among the flat panel displays, the liquid crystal display (LCD) is widely applied to gradually replace the traditional CRT display, and has become a main stream of display on the market due to its advantages of low operation voltage, radiation free, light, thin and small volume.

The LCD mainly comprises a liquid crystal panel and a backlight module (B/L). The liquid crystal itself injected into the liquid crystal panel cannot illuminate. Therefore, the liquid crystal panel has to be illuminated by a plane light source provided by the backlight module, so that the LCD can display images. The conventional backlight module comprises a line light source, a light guide plate (LGP) and a frame. The line light source is usually arranged at one side of the light guide plate, and the light guide plate can convert the line light source into a plane light source. In addition, the frame is used to receive the light guide plate and the line light source so that the light guide plate and the line light source can be integrated. In order to increase the brightness of the backlight module and the display ability of the liquid crystal display, one or more optical films can be arranged above the light guide plate.

FIG. 1A is a schematic diagram of a conventional LCD before an optical film and a frame are assembled. FIG. 1B is a schematic diagram after the optical film and the frame in FIG. 1A are assembled. Referring to FIGS. 1A and 1B, the conventional optical film 110 has many positioning members 112 (only one is depicted) each extending and protruding from the edge of the optical film 110. The frame 120 is arranged in a manner to surround the optical film 110. A number of longitudinal slots 122 are formed on the frame 120 at locations corresponding to the positions of the positioning members 112 of the optical film 110. When assembling the optical film 110, the positioning members 112 are set to correspond the longitudinal slots 122 so as to position based on the fit between the positioning members 112 and the positioning members 112.

However, the aforementioned conventional method for fixing the optical film onto the frame has following drawbacks. The longitudinal slots on the frame have no restriction mechanism. The positioning members of the optical film are merely inserted into the longitudinal slots. Accordingly, positioning errors and shifts of the optical film might easily occur. In addition, when the backlight module needs to be turned over during the assembly of the liquid crystal display, the positioning members of the optical film might get separated from the longitudinal slots 122, causing the optical film slide or shift.

Furthermore, in the conventional technique, a fixing tape 130 is further adhered on the optical film 110 and the frame 120 to increase an fixing strength between the optical film 110 and the frame 120. FIG. 2 is a schematic diagram showing that a fixing tape has been adhered onto the optical film and the frame in FIG. 1B. Referring to FIG. 2, the fixing tape 130 is arranged above the positioning member 112 of the optical film 110 and the longitudinal slot 122 of the frame 120. To adhere the fixing tape 130, the frame 120 located at the two sides of the longitudinal slot 122 can be glued, or the positioning member 112 the frame 120 located at the two sides of the longitudinal slot 122 can be globally glued.

However, using the fixing tape to increase the positioning effect still has the following problems. If the optical film and the frame are globally glued, the optical film might be affected by temperature or humidity so as to cause a waving phenomenon. Therefore, the quality of the outgoing light of the backlight module is adversely affected. In addition, if only the frame is glued, the fixing tape will not create a fixing effect to the positioning members. Therefore, the positioning members will still separate from the longitudinal slots, so that the optical film will slide off. Moreover, although the additional fixing tape can increase the fixing effect, a step of adhering the fixing tape is further required during the assembly, so that the assembling time increases and the material cost for the assembly also increases.

SUMMARY OF THE INVENTION

According to the foregoing description, the present invention is directed to an assembly structure for an optical film and a frame. The assembly structure utilizes a restriction design between positioning structures and slots to provide a better positioning effect between the optical film and the frame, so that the assembly yield of the optical film can be increased.

The present invention is also directed to an assembly structure for an optical film and a frame. The assembly structure can provide a better positioning design between the optical film and the frame so that use of fixing tape can be more flexible, and the assembling time and material cost can be reduced.

According to an embodiment of the present invention, the optical film has a body and at least one positioning structure protruding from an edge of the body, wherein the positioning structure comprises a sticking part and a neck located between the sticking part and the body. The frame is arranged in a manner to surround the optical film, and has at least one slot corresponding to the positioning structure, wherein the positioning structure is located within the slot, and the frame has a restriction protrusion, which is corresponding to the neck of the positioning structure and located at an entrance of the slot for restricting the sticking part of the positioning structure within the slot.

According to an embodiment of the present invention, the optical film has at least one slot at an edge thereof and a restriction protrusion located at an entrance of the slot. The frame is arranged in a manner to surround the optical film and has at least one positioning structure located within the slot. The positioning structure comprises a sticking part and a neck, and the restriction protrusion of the optical film is corresponding to the neck for restricting the sticking part of the positioning structure within the slot.

According to an embodiment of the present invention, a positioning structure can be formed on one of the optical film and the frame, and the slot, which structurally interfere with the positioning structure, is formed on the other optical film so as to restrict shifting of the optical film in the planar direction. The assembly structure, according to an embodiment of the present invention, can provide a better positioning effect between the optical film and the frame. Therefore, the optical film can be prevented from sliding off during the assembly. In addition. Further, because the use of glued tape in the assembly process can be avoided, therefore the material cost can be reduced.

BRIEF DESCRIPTION OF THE DRAWINGS

While the specification concludes with claims particularly pointing out and distinctly claiming the subject matter which is regarded as the invention, the objects and features of the invention and further objects, features and advantages thereof will be better understood from the following description taken in connection with the accompanying drawings.

DESCRIPTION OF THE EMBODIMENTS

Figure 1A:
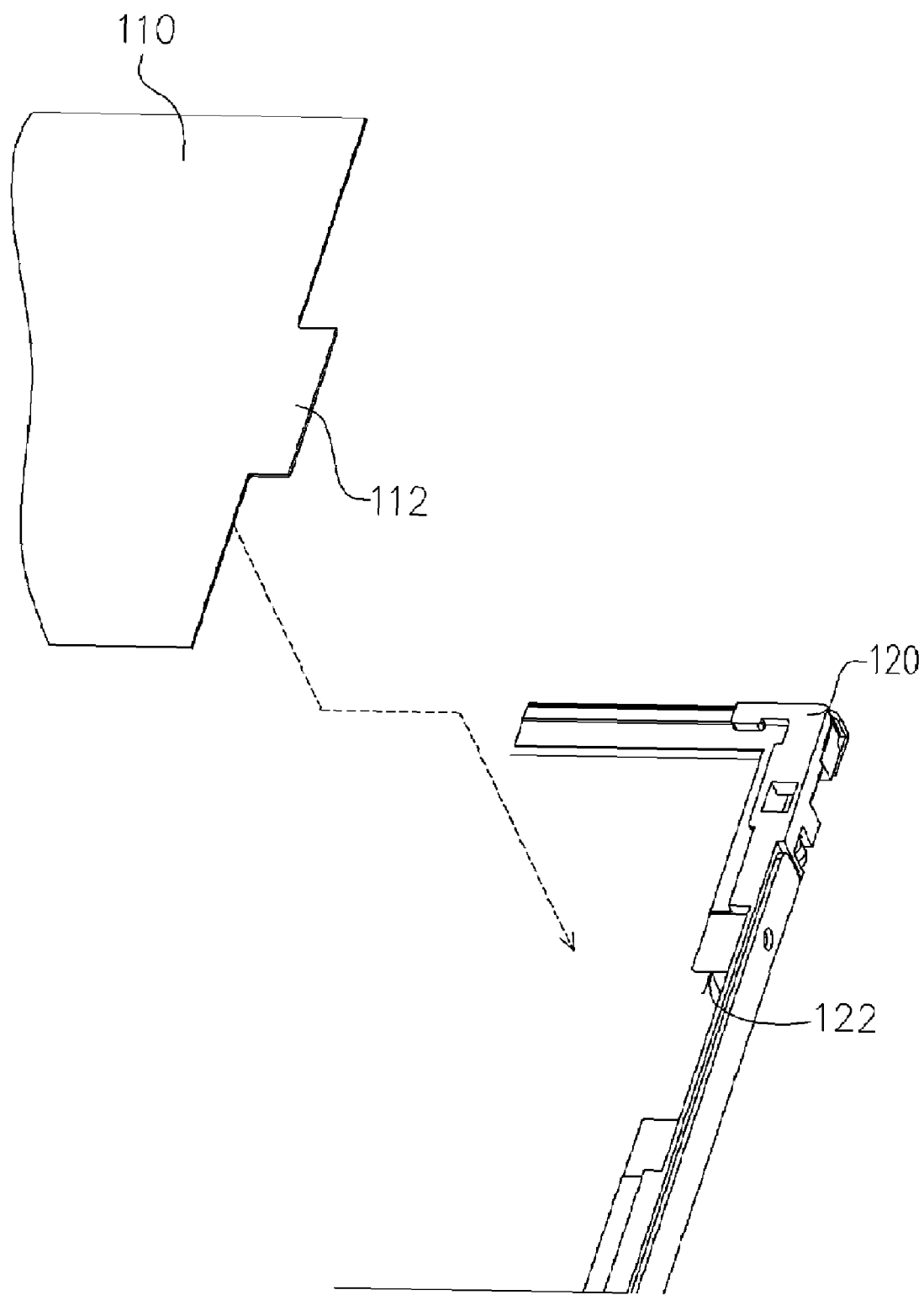
FIG. 1A shows a schematic diagram of a conventional frame before an optical film is assembled onto the frame.
Figure 1B:
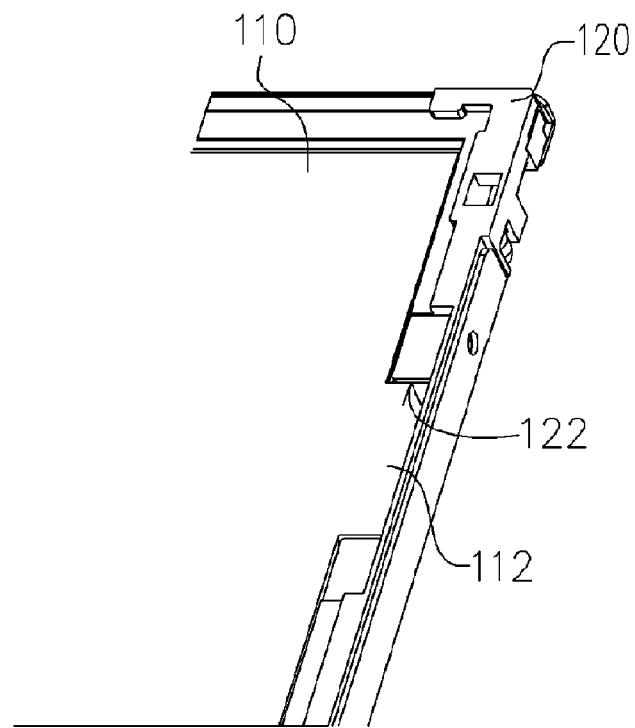
FIG. 1B shows schematic diagram showing after the optical film and the frame in FIG. 1A are assembled.
Figure 2:
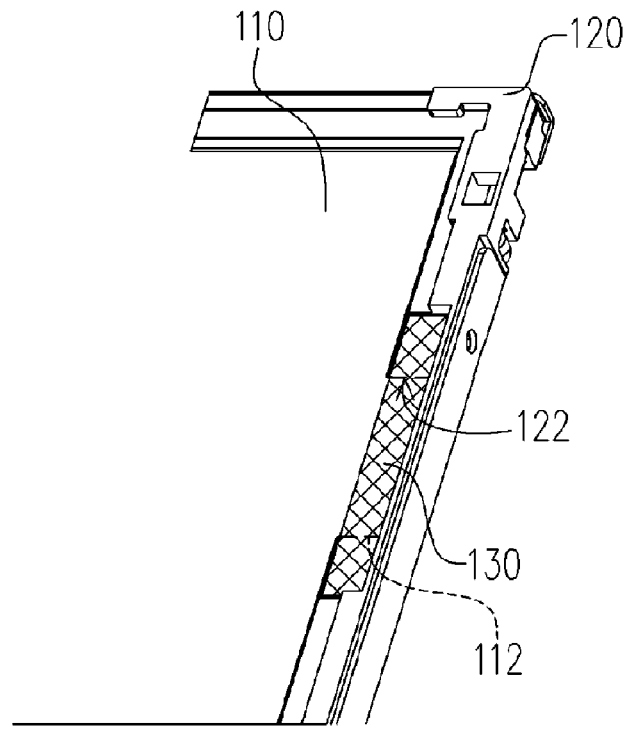
FIG. 2 is a schematic diagram showing a fixing tape adhered onto the optical film and the frame in FIG. 1B.
Figure 3A:
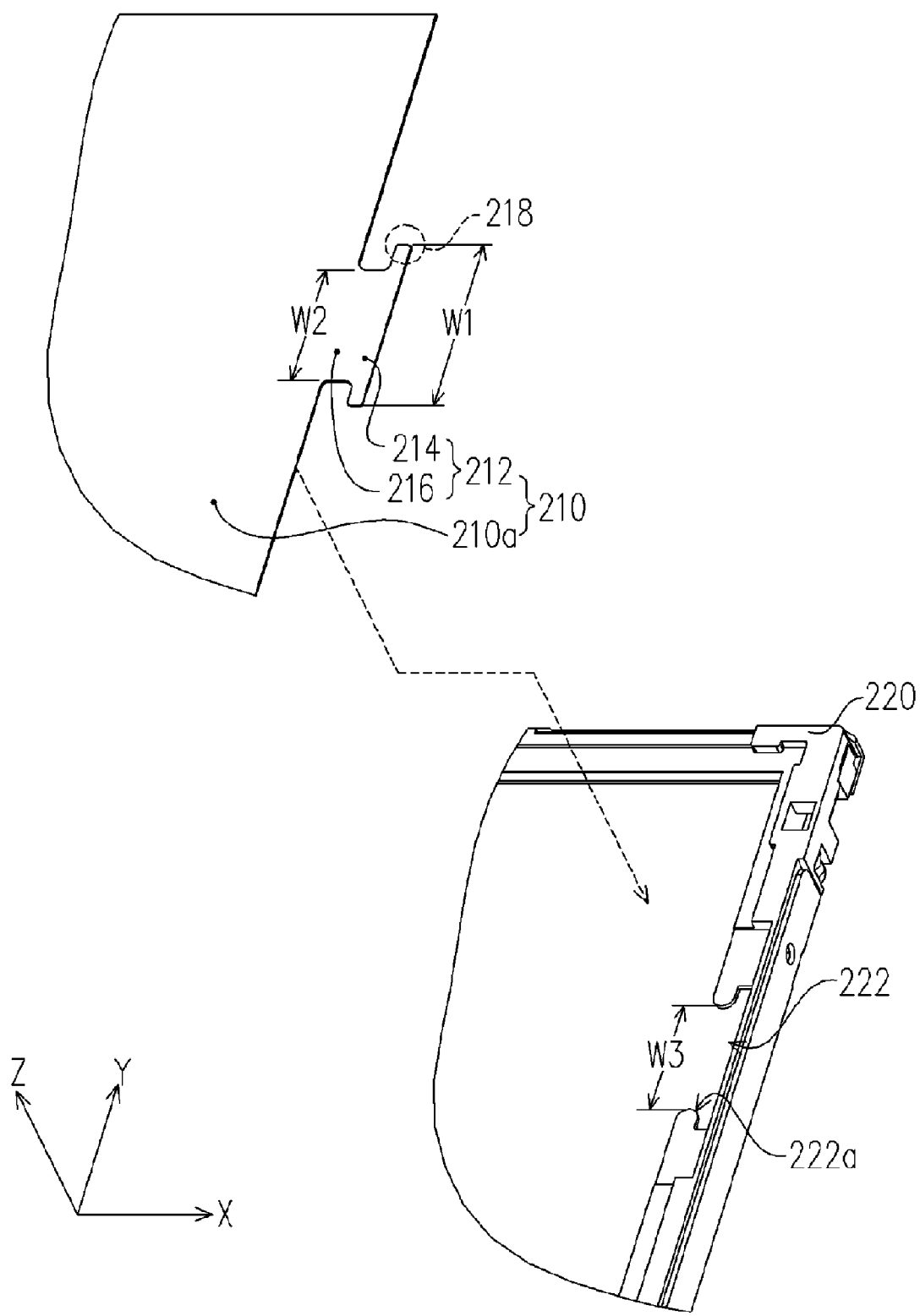
FIG. 3A shows a schematic diagram showing before an optical film and a frame are assembled according to one embodiment of the present invention.
Figure 3B:
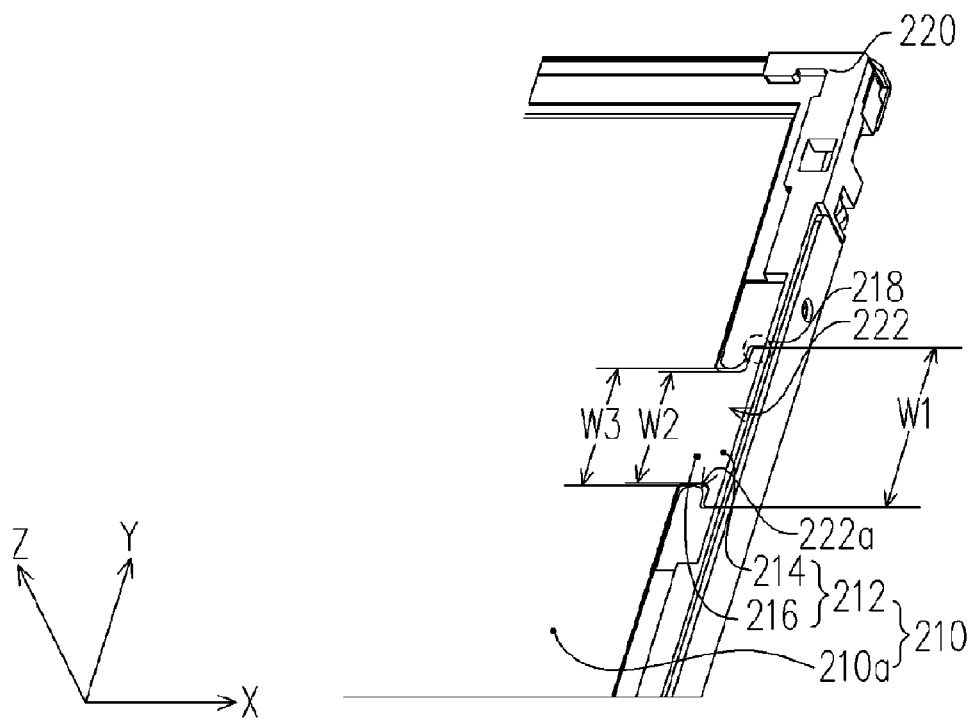
FIG. 3B shows schematic diagram after the optical film and the frame in FIG. 3A are assembled.

FIG. 3A is a schematic diagram before an optical film and a frame are assembled according to one embodiment of the present invention. FIG. 3B is a schematic diagram after the optical film and the frame in FIG. 3A are assembled. Referring to FIGS. 3A and 3B, an optical film 210 can be a diffusion sheet, a prism sheet or a brightness enhancement film, for example. The optical film 210 comprises a body 210a and a number of positioning structures (only one fixing structure is shown) 212. The positioning structure 212 protrudes from an edge of the body 210a, and is formed in a T shape, for example. The positioning structure 212 comprises a sticking part 214 and a neck 216. The neck 216 is connected to the edge of the body 210a, and protrudes outwards from the edge of the body 210a along an X direction. Protrusions 218 extend respectively in the positive Y direction and the negative X direction from one end of the neck 216 away from the body 210a to form the sticking part 214. The width W1 of the sticking part 214 along the Y direction is larger than the width W2 of the neck 216 along the Y direction.

Referring to FIGS. 3A and 3B, a frame 220 is arranged at the outer circumference of the optical film 210. A number of slots (only one slot is shown) 222 are formed on the frame 220 at locations corresponding to the positions of the positioning structures 212, and the positioning structures 212 of the optical film 210 can be set to the corresponding slots 222. In addition, an restriction protrusion 222a of the slot 222 is invaginated. The width W3 of the restriction protrusion 222a along the Y direction is between the width W1 of the sticking part 214 and the width W2 of the neck 216. The neck 216 of the positioning structure 212 is located at a location corresponding to the restriction protrusion 222a of the slot 222. Therefore, the protrusions 218 of the sticking part 214 is restricted by the restriction protrusion 222a and fastened within the slot 222, so that the optical film 210 is positioned in the X and the Y directions.

In the present embodiment of the present invention, the shape of the slot can be a T shape that matches with the shape of the positioning structure 212. A gap can be further formed between the slot 222 and the positioning structure 212 for providing the optical film 210 an extension/contraction buffer region for compensating the temperature or the humidity affection. If the positioning structure 212 can be received, the shape of the slot 222 can be a recession restriction protrusion 222a wide enough to provide a restriction effect for the positioning structure 212, and need not match with the shape of the positioning structure. For example, the method of forming the slot 222 is to directly form a recession on the surface of the frame 220, or to arrange molded protrusion plates on the frame to form the required slot 222.

Figure 4:
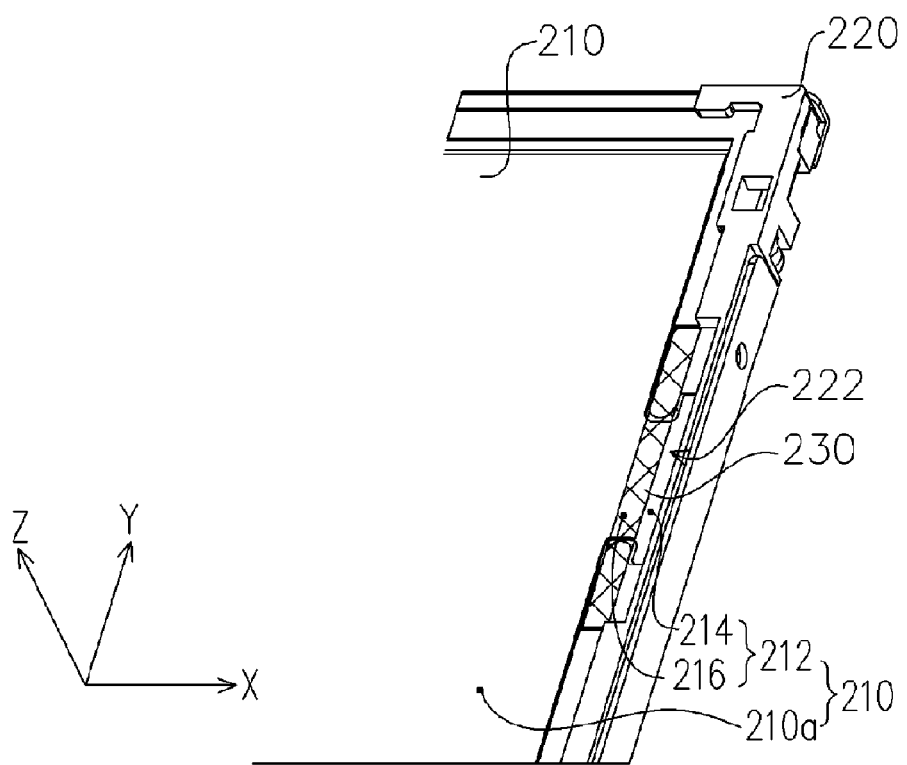
FIG. 4 is a schematic diagram showing a fixing tape is adhered onto the optical film and the frame in FIG. 3B.

In one embodiment of the present invention, a fixing tape can be further adhered on a fastened location of the optical film 210 and the frame 220 so that the optical film 210 can be fixed in the Z direction. FIG. 4 is a schematic diagram showing a fixing tape is adhered onto the optical film and the frame in FIG. 3B. Referring to FIG. 4, the fixing tape 230 is arranged above the positioning structure 212, and two ends of the fixing tape 230 are respectively adhered onto the frame 220 located at two sides of the neck 216. In this way, by the restriction effect on the X–Y plane provided by the positioning structures 212 and the slots 222, and the restriction effect in the Z direction provided by the fixing tape 230, the optical film 210 can be effectively prevented from sliding out of the frame 220 during the assembly, so that the assembly yield can be increased.

Since the positioning structure and the slot are able to provide a restriction effect on the X–Y plane, the overall area of the fixing tape and the glued area and the position of the fixing tape can be adjusted to meet the requirements when attaching the fixing tape. For example, as shown in FIG. 4, only the two ends of the fixing tape 230 require glue to adhere the fixing tape 230 onto the frame 220. In this way, the amount of glue can be reduced, and the optical film waving due to the glue can be prevented. Furthermore, the fixing tape 230 is not necessary to cover the entire slot 222, and therefore, the area of the fixing tape can be reduced and the material cost can be also reduced. Of course, if the film waving due to the glue is not considered, the optical film 210 and the frame can be globally glued to increase the adhesion strength.

As described above, the restriction effect of the positioning structure can be achieved by the protrusions of the positioning structure and the slot with the recessed opening on the frame. However, according to the features of the present invention, the above embodiment can achieve the better positioning of the optical film. The design concept of the present invention is further described below with reference to the following drawing.

Figure 5:
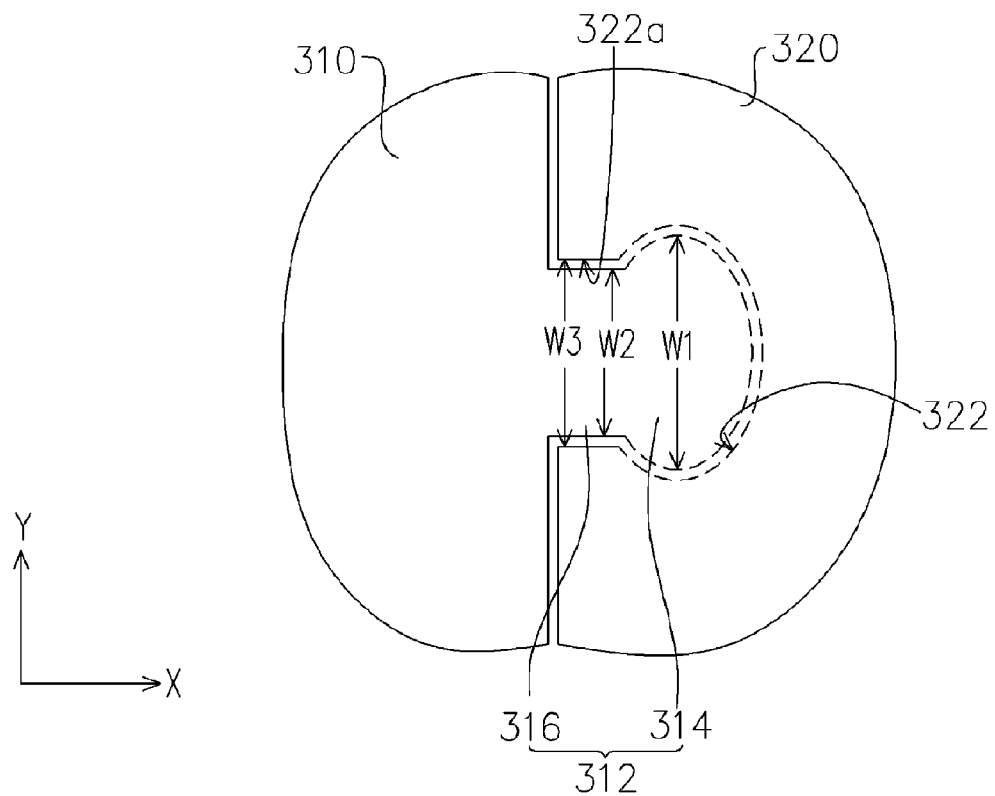
FIG. 5 is a schematic diagram showing a combination between a fixing structure and a slot according to the present invention.

FIG. 5 is a schematic diagram showing a combination of the positioning structure and the slot according to the present invention. Referring to FIG. 5, a positioning structure is formed on the first object 310, and comprises a sticking part 314 and a neck 316. The width W2 of the neck 316 along the Y direction is smaller than the width W1 of the sticking part 314 along the Y direction. In addition, a slot 322 is formed on the second object 320 for receiving the positioning structure 312. The width W3 of an opening 322a of the slot 322 along the Y direction is between the width W2 of the neck 316 and the width W1 of the sticking part 314. In this way, by using the structure of the slot 322 and the positioning structure 312 having the neck 316, a restriction effect on the X–Y plane can be achieved.

According to the above design concept, the shape of the positioning structures and the slots of the present invention can be formed in variety of shapes. For example, the position structures can be an L shape, and the shape of the sticking part of the positioning structure can be circular, elliptical or polygonal, etc., for example. The slot can be a slot of any shape corresponding to the positioning structure.

Figure 6:
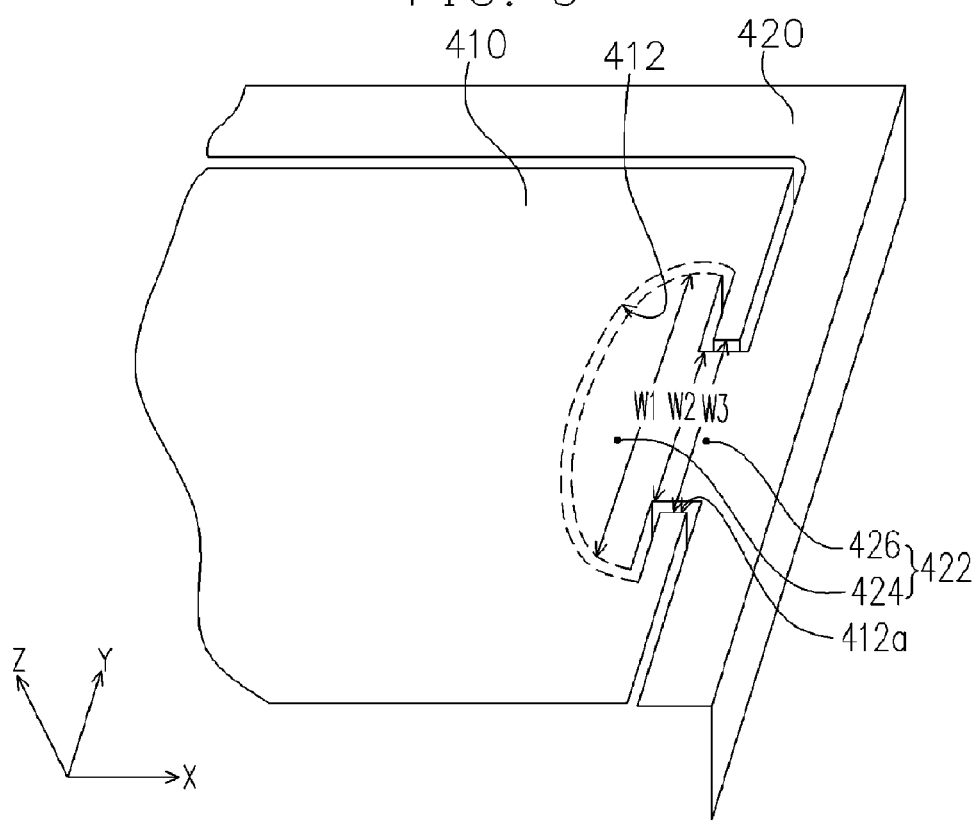
FIG. 6 is a schematic diagram showing an assembly structure of an optical film and a frame according to another embodiment of the present invention.

According to the present invention, the position structures can be alternatively formed on the frame and the slots are correspondingly formed on the optical film. This arrangement can also achieve the purpose of the present invention. FIG. 6 is an assembly structure of an optical film and a frame according to another embodiment of the present invention. Referring to FIG. 6, a number of slots 412 are formed on the edges of the optical film 410. The opening 412a of the slot 412 is invaginated. In addition, the frame is arranged in a manner to surround the optical film 410, and a number of positioning structures 422 is arranged on the frame 420. Each positioning structure 422 also has a sticking part 424 and a neck 426. The width W1 of the sticking part 424 in the Y direction is larger than the width W3 of the opening 412a of the slot 412 in the Y direction. The width of the neck in the Y direction is smaller than the width W3 of the opening 412a. In this way, the sticking part 424 of the positioning structure 422 can be restricted within the slot 412 by the opening 412a.

As described above, the shape of the positioning structure according to the embodiment can be a T shape or an L shape, and the shape of the sticking part can be circular, elliptical or polygonal, etc. In addition, the shape of the slot can match with the positioning structure, or the shape of the slot can be of any other shapes that can receive the positioning structure and achieve the restriction effect.

In summary, the assembly structure of the optical film and the frame according to the present invention has at least the following advantages. A better positioning effect can be provided between the optical film and the frame, and the optical film can be firmly fixed on the frame to prevent the optical film from sliding out off the frame during the assembly and thereby increase the assemble yield. In addition, the optical film can be securely fixed on the plane. Therefore, the optical film is not necessary to be glued, so that the optical film can be prevented from waving due to the adverse effect of temperature or humidity. Accordingly, the assembling time can be reduced. Furthermore, because the use of glued tape in the assembly process can be avoided, therefore, the material cost can be reduced.

While the present invention has been described with a preferred embodiment, this description is not intended to limit our invention. Various modifications of the embodiment will be apparent to those skilled in the art. It is therefore contemplated that the appended claims will cover any such modifications or embodiments as fall within the true scope of the invention.

What is claimed is:

1. An assembly structure, comprising:
   an optical film, having a body and at least one positioning structure protruding from an edge of the body, wherein the positioning structure comprises a sticking part and a neck located between the sticking part and the body;
   a frame, surrounding the optical film and having at least one slot corresponding to the positioning structure, wherein the positioning structure is located within the slot, and the frame has a restriction protrusion, which is corresponding to the neck of the positioning structure and located at an entrance of the slot for restricting the sticking part of the positioning structure within the slot; and
   a fixing tape arranged above the positioning structure, wherein two ends of the fixing tape are respectively adhered on the frame corresponding to two sides of the neck to allow a relative displacement between the frame and the optical film.

2. The assembly structure of claim 1, wherein a shape of the positioning structure is a T shape or an L. shape.

3. The assembly structure of claim 1, wherein the sticking part is circular, elliptical, or polygonal in shape.

4. The assembly structure of claim 1, wherein a shape of the slot matches the shape of the positioning structure.

5. An assemble structure, comprising:
   an optical film, having at least one slot at an edge thereof and a restriction protrusion located at an entrance of the slot;
   a frame, surrounding the optical film and having at least one positioning structure located within the slot, wherein the positioning structure comprises a sticking part and a neck, and the restriction protrusion of the optical film is corresponding to the neck for restricting the sticking part of the positioning structure within the slot; and
   a fixing tape arranged above the positioning structure, wherein two ends of the fixing tape are respectively adhered on the optical film corresponding to two sides of the neck to allow a relative displacement between the frame and the optical film.

6. The assembly structure of claim 5, wherein a shape of the positioning structure is a T shape or an L shape.

7. The assembly structure of claim 5, wherein the sticking part is circular, elliptical, or polygonal in shape.

8. The assembly structure of claim 5, wherein a shape of the slot matches with the shape of the positioning structure.

* * * * *